R. E. OLDS.
POWER LAWN MOWER.
APPLICATION FILED MAY 22, 1914.
1,131,156.
Patented Mar. 9, 1915.
2 SHEETS—SHEET 1.
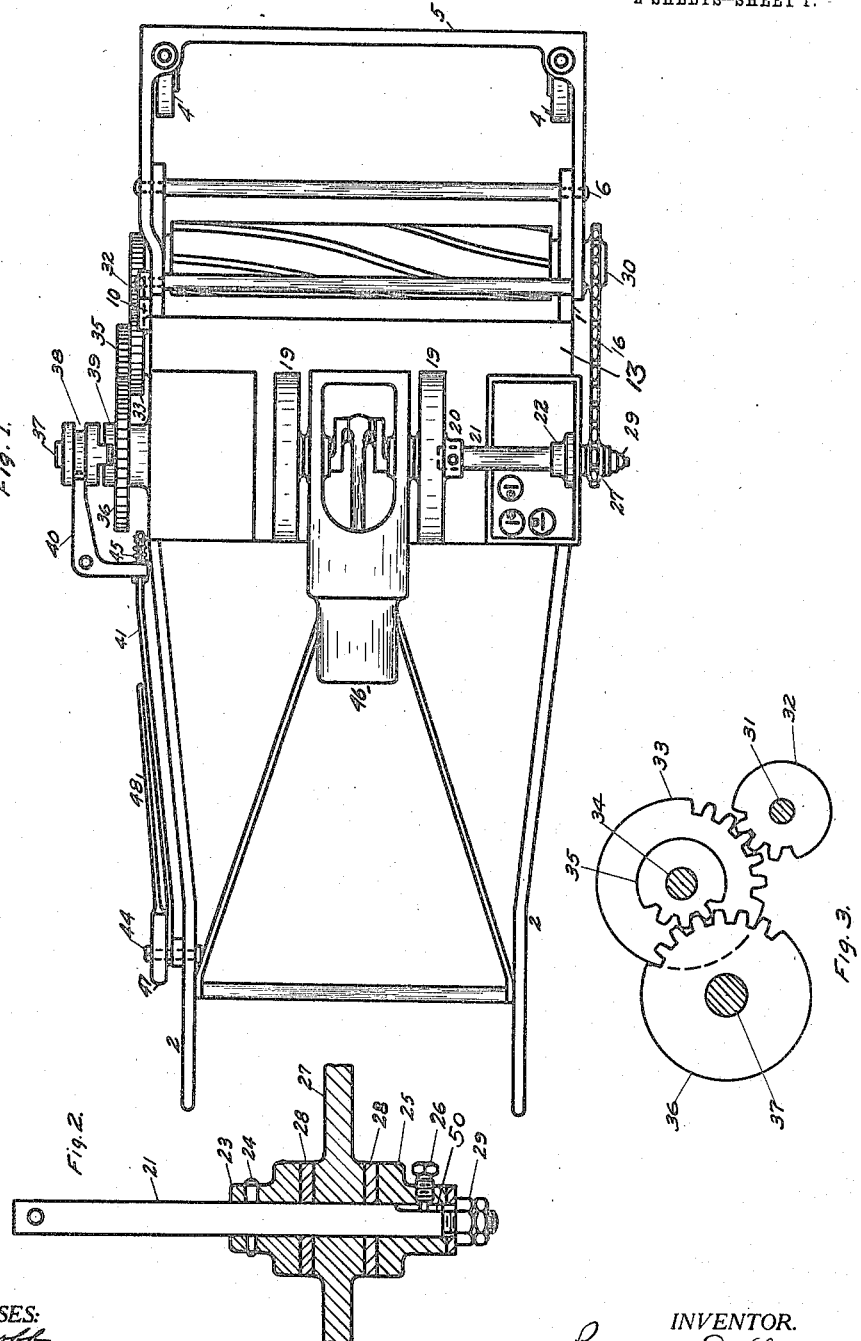
WITNESSES:
L. G. Cobb.
Minette Van Deusen.
INVENTOR.
Ransom E. Olds
BY Clark C. Moore
ATTORNEY.

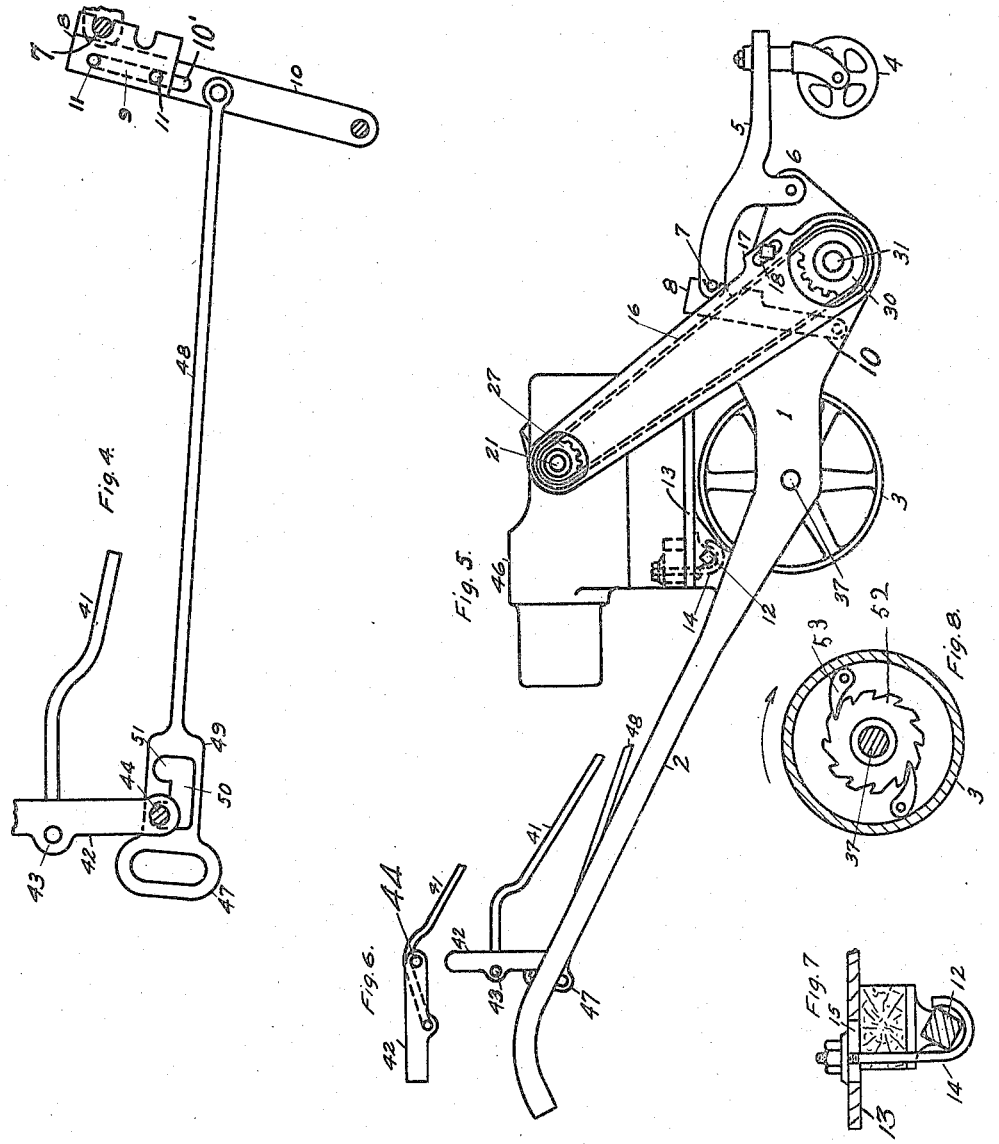

UNITED STATES PATENT OFFICE.

RANSOM E. OLDS, OF LANSING, MICHIGAN.

POWER LAWN-MOWER.

1,131,156.  Specification of Letters Patent.  Patented Mar. 9, 1915.

Application filed May 22, 1914. Serial No. 840,328.

*To all whom it may concern:*

Be it known that I, RANSOM E. OLDS, a citizen of the United States, residing at Lansing, in the county of Ingham and State of Michigan, have invented a new and useful Improvement in Power Lawn-Mowers, of which the following is a specification.

My invention relates to lawn mowers and more especially to those intended to be driven by power, and its purpose is to make a lawn mower that shall be adapted to be driven by an internal combustion engine, and that shall be safe, powerful and reliable in operation.

I attain these purposes by the means shown in the accompanying drawings, in which—

Figure 1 is a plan view of a mower embodying my device, taken from above, Fig. 2 is a detail view of one of the drive gear connections, Fig. 3 is a detail view showing in side elevation the gear connection between the revolving cutter shaft and the traction drum, Fig. 4 is a detail view of the means holding the cutter frame in different positions of adjustment, a portion of the clutch shifting mechanism being also illustrated, Fig. 5 is a side elevation taken from the right hand side of the machine, Fig. 6 is a detail view of a part of the clutch shifting mechanism, Fig. 7 is a detail view illustrating the adjustable connection between the platform and the main frame of the device, Fig. 8 is a detail view of a ratchet gear connection for the traction drum.

Referring more particularly to the drawings, 1 is the main frame of my device which is supplied with guiding handles 2. It is supported at the rear by a driving drum 3 and at the front end are caster-wheels 4, which are mounted in an auxiliary frame 5, that is hinged at 6 to the front end of the main frame 1. The auxiliary frame 5 is extended toward the rear and provided with a pin 7, which is adapted to engage with notches in the plate 8. The arrangement of these parts is such that when the pin 7 is in engagement with the uppermost notch of the plate 8, the cutter bar is supported free from the ground for transportation, and when it is in the lower notch it is dropped for operating purposes. The plate 8 is carried by a bar 10, which is pivoted at one extremity to the frame of the mower and is provided in the other extremity with a longitudinal slot 9. The plate 8 may be formed integral with the bar 10 as shown in Fig. 1 of the drawings, or said plate may be adjustably secured to the bar 10 as illustrated in Fig. 4 of the drawings so that the plate can be adjusted relative to the bar, and the auxiliary frame held fixed in different positions by its engagement with the plate to regulate or vary the length of cut. In the construction illustrated in Fig. 4 of the drawings the upper end of the bar 10 is shown provided with an elongated slot 10' adapted to be engaged by bolts 11 passing through the plate and clamping the same to the bar.

12 is a cross bar forming part of the frame 1. Upon this cross-bar is slidably mounted a platform 13, which may be secured in any desired manner to the frame of the mower. In the present instance it is attached to the cross-bar 12 by hook bolts 14, and is provided with slots 15 to permit the longitudinal adjustment as before stated. By means of this longitudinal adjustment it becomes possible to tighten the sprocket chain 16. The chain guard 17 is also provided with a slot 18 for the same purpose.

The internal combustion engine 46, which may be of any suitable design that can be conveniently mounted on the frame of the mower, is mounted on the platform 13. The hub 20 of the balance wheel 19 is extended and hollowed out to receive an auxiliary shaft 21, which is extended outward and revolves in an outer bearing 22. A collar 23 is secured to the shaft 21 in any suitable manner, as by a pin 24. A second collar 25 is slidably mounted on the extremity of the shaft 21 so as to revolve with it by means of a feather key, or by the set screw 26, the point of which is adapted to slide in a key-way 50 cut in the shaft 21. A sprocket wheel 27 is mounted between the collars 23 and 25 so as to revolve freely on the shaft 21. On each side of the sprocket wheel is a friction washer 28. The position of the collar 25 is regulated by lock-nuts 29 to adjust the degree of friction between the collars 23 and 25 and the sprocket wheel 27. A second sprocket wheel 30 is mounted on the shaft 31 of the cutter knives, and is driven from the sprocket 27 by the sprocket chain 16. On the opposite end of the shaft 30 is mounted a pinion 32 which engages with an idler gear 33 revolving freely on a stud 34, attached to the frame of the machine. The gear 33 has attached to it a pinion 35, which engages with a gear 36 that revolves freely on the shaft 37 of the drum 3. It is evident, however, that the necessary reduction of speed from the cutter shaft to the propelling drum 3 may be provided in several different ways or various positions to the gears, etc., without departing from my invention. A clutch member 38 is feather keyed to the shaft 37 and engages with a corresponding clutch member 39 attached to the gear 36.

The member 38 is operated by a bell-crank lever 40 connected by a link 41 to an operating lever 42. The extremity of the lever 42 is pivoted to one of the handles 2, or in any other suitable position for convenient access, and the point of attachment 43 of the link 41 is so fixed that when the lever 42 is pressed downward parallel with the handle, the point 43 will pass slightly beyond the center line of the pivot 44, and therefore retain the clutch 38 in a locked position. A spring 45 is placed at the clutch extremity of the link 41 to permit the necessary yielding in bringing the clutch into engagement. The arm 10 is operated by a handle 47 and link 48. The handle 47 is provided with an enlarged portion 49 in which is formed an opening 50 provided with two notches 51. These notches are adapted to receive the pin 44. When the pin is in the notch nearest the handle, the pin 7 in the auxiliary frame will be engaged, as shown in Fig. 4 of the drawings, with the uppermost notch in the plate 8 but when the handle 47 is drawn toward the rear and placed in the other notch, the auxiliary frame 5 will be released entirely from the bar 10 and will therefore be free for any desired adjustment.

If in operating my device the cutting knives should be suddenly stopped as by catching a stick or by being choked in heavy grass, the sprocket wheel 27 will slip between the friction washers 28 and prevent breakage of the machine. It will also be noted that by means of my construction I secure an extremely powerful drive for the cutter bars. In the usual construction the cutter bar is driven from the drum 36, while in my device this arrangement is reversed. The cutter bar is driven directly from the engine and the train of gears shown in Fig. 3 transmit the power to the propelling drum 3. In Fig. 8 is shown the means by which drum itself is driven. A ratchet-wheel 52 is attached to the shaft 37 and engages with dogs 53 of the drum 3.

I claim as my invention and desire to secure by Letters Patent:

1. In a lawn mower, the combination with a main frame, a wheel support therefor, cutting mechanism mounted on the main frame in advance of the wheel support, of an auxiliary frame at the front of the main frame provided with ground wheels, said auxiliary frame being adapted to support the front of the main frame at different elevations, the auxiliary frame being pivotally connected to the main frame for adjustment relative thereto, and means for locking the auxiliary frame to the main frame in different positions of adjustment, said means including a bar pivoted to the main frame at its lower end and provided with a plurality of seats, an operating rod connected with the said bar, and means for locking said rod to the main frame, said auxiliary frame being provided with a portion adapted to be engaged with the seats of said bar.

2. In a lawn mower, the combination with a main frame, a wheel support therefor, cutting mechanism mounted on the main frame in advance of the wheel support, of an auxiliary frame at the front of the main frame provided with ground wheels, said auxiliary frame being adapted to support the front of the main frame at different elevations, the auxiliary frame being pivotally connected to the main frame for adjustment relative thereto, and means for locking the auxiliary frame to the main frame in different positions of adjustment, said means comprising a bar pivotally connected at its lower end to the main frame, a plate mounted on the bar for adjustment along the same, said plate being provided with a plurality of notches, an operating rod connected to the said bar, and means for locking the rod to the main frame, said auxiliary frame being provided with a portion adapted to be engaged with the notches in the said plate, substantially as described.

RANSOM E. OLDS.

Witnesses:
JAMES H. THOMPSON,
ROY H. WHIPPLE.